Oct. 17, 1967   H. L. FELDKIRCHNER ETAL   3,347,647
CONVERSION OF SOLID FOSSIL FUELS TO HIGH-BTU PIPELINE GAS
Filed Aug. 21, 1963
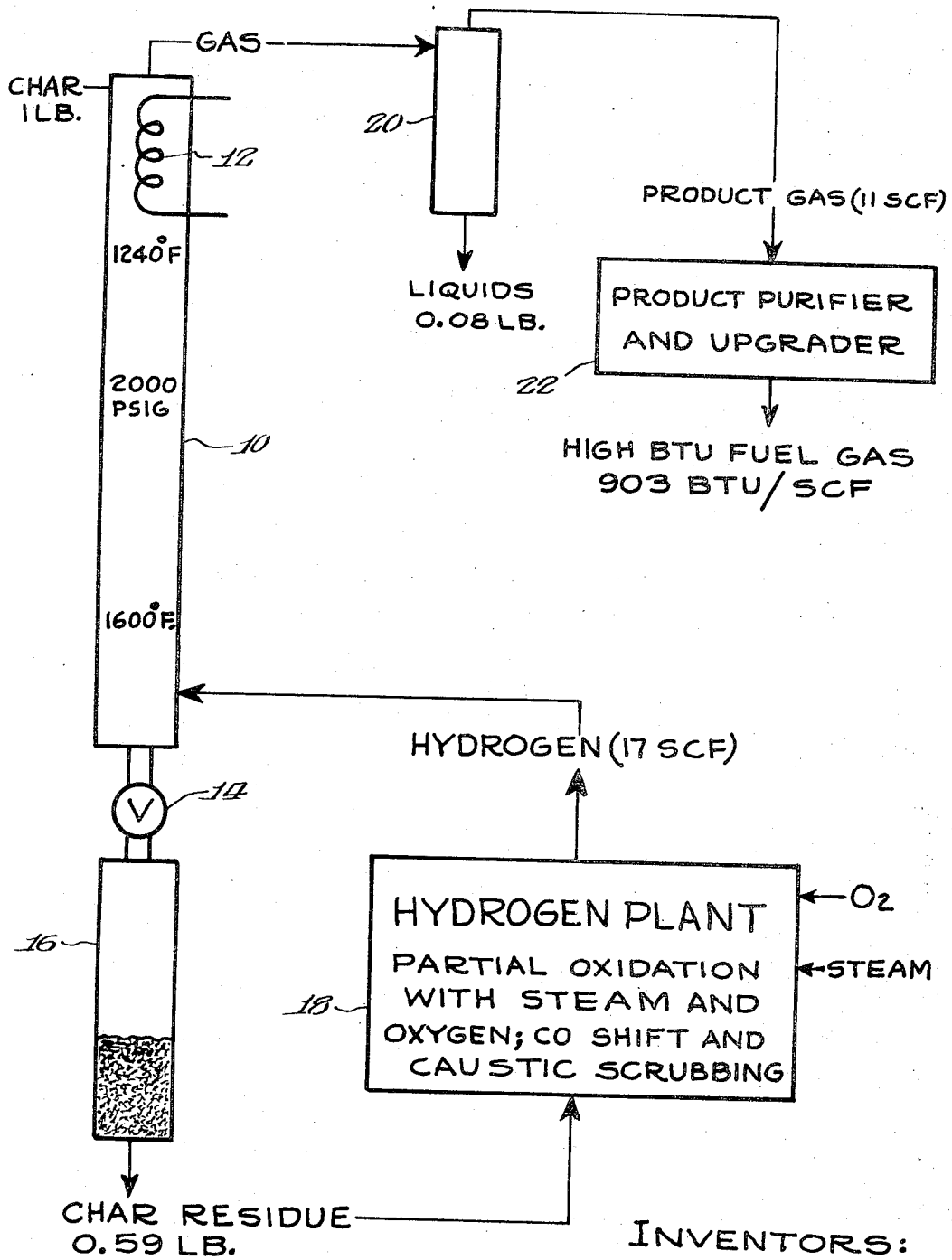
INVENTORS:
Harlan L. Feldkirchner
Henry R. Linden
Eugene J. Pyrcioch
BY Bair, Freeman & Molinare ATTYS

United States Patent Office 3,347,647
Patented Oct. 17, 1967

3,347,647
CONVERSION OF SOLID FOSSIL FUELS TO HIGH-B.T.U. PIPELINE GAS
Harlan L. Feldkirchner, Oak Park, Henry R. Linden, Hinsdale, and Eugene J. Pyrcioch, Chicago, Ill., assignors, by mesne assignments, to American Gas Association, Inc., New York, N.Y., a not-for-profit corporation of New York
Filed Aug. 21, 1963, Ser. No. 303,640
7 Claims. (Cl. 48—197)

This invention relates to an improved method for making from solid fossil fuels a fuel gas which is interchangeable with natural gas. Synthetic production of fuel gas is desirable to meet the supply for utility pipeline gas in those areas where the demand exceeds the supply, particularly during periods of peak load. Such pipeline gas must preferably be made from a cheap fuel of which there are substantial future reserves in the United States. Additionally, the process from which the gas is made must be competitive with other premium energy sources.

Oil has been proposed heretofore as a raw material for making a natural gas substitute, and high B.t.u. gases have been satisfactorily produced from various oils. But the oil reserves within the United States are estimated at 185 billion barrels, which is equivalent in heating value to about 1000 trillion cubic feet of natural gas. In contrast, coal reserves in the United States which are economically recoverable, are equivalent in heating value to about 17,000 trillion cubic feet of natural gas. The present process is designed to produce a fuel from coal which is interchangeable with natural gas. The end product is of such quality that it can be substituted for natural gas in any proportion, i.e., it is completely interchangeable.

In accordance with the present process, solid fossil fuel such as low temperature bituminous coal char, lignite char, or nonagglomerating coal is hydro gasified to provide a fuel gas having a final heating value, after purification with convention techniques, of 900 B.t.u./s.c.f. or greater, and which consists essentially of methane with a minor proportion of hydrogen. Prior to hydrogasification, the coal is pretreated in air or other suitable gas at temperatures of from 400 to 720° F. for 50 to 75 minutes in a fluidized bed to provide a patriculate char. Lignite does not agglomerate but pretreatment removes undesirable oxygen-containing constituents. The particles of char are then fed countercurrent to a flowing stream of hydrogen gas in a reactor maintained at a pressure of 1000 to 2000 or more pounds per square inch gauge, and at two different temperature levels. The amount of char fed to the reactor is sufficient to produce, in addition to substantial quantities of product gas, solid char residue in a sufficient qauntity to make all the required hydrogen for the hydrogasification reaction. Thus the invention provides a balanced system wherein the coal supplies all hydrocarbon requirements for the product gas and the reaction hydrogen.

There are two important factors, which in combination, result in the successful operation of the present process: countercurrent flow of the char and hydrogen, and the maintenance of two temperature zones within the reactor. We have found in kinetic studies that the initial stage of the hydrogasification reaction is very rapid and that the rate is not significantly affected by variation in temperature in the range of 1300° to 1700° F. However, during the later stage of the reaction, the rate is very strongly dependent upon temperature, and increases with increases in temperature. The maximum, or equilibrium, concentration of methane which can be produced is also strongly dependent upon temperature, but inversely; that is, the equilibrium methane concentration decreases sharply with increasing temperature. Thus, at relatively low temperatures a high heating value gas (one rich in methane) could be produced, but only at long reaction times. On the other hand, at relatively high temperatures, a high heating value gas could not be produced regardless of the reaction time. We have also found that the equilibrium methane concentration is much higher for raw char than for partially gasified char. Upon these surprising observations our invention is based.

By employing countercurrent flow in combination with dual reaction temperature zones, the raw feed char enters the low temperature end of the reactor and mixes with an atmosphere which contains a relatively high concentration of methane. The hydrogen enters the high temperature end of the reactor and reacts with the partially-gasified char where the methane concentration is relatively low. Thus conditions provided by our improved process are most favorable for continuously producing a high heating valve gas in minimum time.

The char which is introduced into the low temperature end of the reactor forms a fluid or moving bed within the reaction chamber and moves downwardly countercurrent to the upward flow of the hydrogen gas. A large quantity of the char is hydrogenated almost immediately upon entering the reactor since the initial stages of the reaction are very rapid. During this period pyrolysis occurs simultaneously with hydrogenolysis of the char. The pyrolysis of the char produces (from essentially aliphatic hydrocarbon side chains and oxygenated functional groups) hydrocarbons, oxygenated compounds and intermediates which undergo rapid secondary vapor phase hydrogenolysis not too different from that encountered in petroleum hydrogasification. The remainder of the carbon in the char is converted to methane much more slowly. The reaction, which takes place in the lower temperature end of the reactor, may be represented by the following equation:

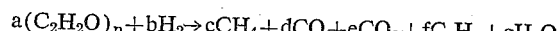

The second plate phase reaction which takes place in the lower end of the reactor is as follows:

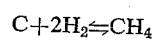

This reaction is characterized by a relatively slow rate of methane formation which approaches the rate of carbon-hydrogen reaction at nearly complete conversion. The representations of the reactions are of course greatly simplified but are believed sufficient to charactetrize the two greatly different reaction rates which have been observed.

The optimum temperature for the upper zone of the reaction chamber should be maintained between 1200° and 1300° F. and the lower zone at 1550° or more, preferably at temperatures between 1600° and 2000° F. This temperature profile is critical to achieve the objectives of the invention.

The char residue which remains after the hydrogasification reactions have been completed is converted by conventional gasification with steam and oxygen to produce hydrogen sufficient for the requirements of the reaction. The product gas taken directly from the hydrogasification reactor contains 70 to 80% methane, 15 to 25% hydrogen, about 1% other gaseous hydrocarbons and up to 5% of a mixture of carbon monoxide, carbon dioxide and nitrogen. This product gas has a heating value of 800 to 900 B.t.u./s.c.f. The gas is then scrubbed to remove ammonia and hydrogen sulfide. The carbon monoxide is then reduced to less than 0.1 mole percent by conversion to methane over a nickel methanation catalyst. By means of these two purification steps the heating value of the fuel is increased to over 900 B.t.u.'s per standard cubic foot.

In the drawing we have illustrated diagrammatically a process which has been used for successfully producing high B.t.u. fuel gas from bituminous coal char. The reactor 10 consists of a vertically disposed cylinder capable of withstanding several thousand pounds per square inch internal pressure and internal temperatures up to about 2000° F. A cooling coil 12 is provided in the upper portion thereof and a heat transfer medium is circulated therethrough to maintain the temperature in this zone at the desired level. The lower end of the reactor connects through solids feeder 14 to a reservoir 16 for receiving the char which remains after the gasification reaction, referred to as the "char residue." The char residue is converted to hydrogen in the gasification plant 18. A condenser 20 is provided to condense liquids from the product gas and connects to a purification and upgrading system 22.

The char, charged into the top of the reactor 10, is prepared from pretreated coal to substantially reduce agglomeration tendencies. In operation of our process, bituminous coal (13,140 B.t.u./# dry basis, 9% moisture as received) was pretreated in a fluidized bed with air for one hour at a maximum temperature of about 600° F. Details of suitable pretreatments may be found in the literature, for example an article by K. C. Channabasappa and H. R. Linden, appearing in Industrial Engineering Chemistry 50, pages 637–44 (1958). The analysis of the char was as follows: 78.6% carbon, 3.21% hydrogen, 0.92% sulfur, 11.25% oxygen+nitrogen, and 6.02% ash.

The char was fed continuously into the top of the reactor 10, countercurrent to the flow of hydrogen, which was introduced at the bottom of the reactor. Seventeen standard cubic feet of hydrogen were introduced for each pound of char. Pressure within the reactor was maintained at 2000 p.s.i.g. The char was introduced into the reactor at a rate of 20 pounds per cubic foot of reactor volume per hour. The hydrogen feed rate corresponded to a superficial velocity of about 0.06 feet per second. The temperature in the upper zone of the reactor was maintained at 1240° F. by removing the exothermic heat of reaction with water passing through the coil 12. The lower portion of the reactor remained at about 1600° F. under the conditions indicated. All heat is supplied by the exothermic hydrogenation reaction. The product gas was removed from the top of the reactor and passed through condenser 20 to condense water and some organic liquids in the gas. About .08 lb. of liquor were removed for each pound of char introduced into the system. The product gas was produced in quantities of 11 s.f.c./lb. of feed char and had a heating value of 870 B.t.u.'s per standard cubic foot. The composition of the gas was as follows: 79.3% $CH_4$, 0.6% $C_2H_6$, 0.3% $C_6H_6$, 16.5% $H_2$, and 3.3% $N_2+CO+CO_2$. Heating value=869.4 B.t.u./s.c.f. The product gas was then scrubbed to remove ammonia and hydrogen sulfide. The carbon monoxide and part of the hydrogen were then converted to methane by catalytic methanation. The final composition was as follows: 84.3% $CH_4$, 0.6% $C_2H_6$, 0.3% $C_6H_6$, 12.8% $H_2$, 2.0% $N_2+CO_2$. Heating value=903 B.t.u./s.c.f.

The char residue discharged into reservoir 16 amounted to 0.59 pound per pound of feed char and this material was sent to hydrogen plant 18 where 95% hydrogen was produced by the well known Texaco partial oxidation process. The char was gasified in the presence of oxygen and steam at 2450° F., the resultant gas was subjected to the CO shift reaction in the presence of an iron-chromium catalyst at 800° F. This modified gas was then purified to remove carbon dioxide and hydrogen sulfide by caustic scrubbing. The resultant product gas consists of about 95 to 97% hydrogen, which gas is fed directly into the lower end of the hydrogasification reactor. The quantity of hydrogen produced is equivalent to that required for the production of the high B.t.u. fuel gas. The well known Texaco process is described in an article by D. Eastman, "Preliminary Report on Coal Gasification," in "Gasification and Liquefaction of Coal," Symposium, A.I.M.M.E., New York (1953), pp. 73–79 (symposium at the annual meeting of the American Institute of Mining and Metallurgical Engineers, Feb. 20 and 21, 1953).

In a plant of the kind illustrated, the bituminous coal used as the starting material supplies all of the energy requirements at a plant efficiency of about 61%. About 38% of the carbon in the char is converted to high B.t.u. fuel gas and correspondingly 62% is converted to hydrogen-rich gas.

The product gas after purification has a heating value of over 900 B.t.u.'s per standard cubic foot.

It will be understood that the amount of hydrogen which is required to make the high B.t.u. fuel gas will vary in accordance with the particular char being used. The more combined hydrogen and the less combined oxygen in the char, the less gaseous hydrogen need be introduced. Other modifications can be made without departing from the principles of our invention, the scope of which is set forth in the appended claims.

We claim:

1. A method for producing a fuel gas interchangeable with natural gas and having a heating value of about 800 to 900 B.t.u./s.c.f. which comprises continuously charging particulate solid fossil fuel selected from the group consisting of bituminous coal char, lignite char, and non-agglomerating coal into one end of an elongated reaction chamber at a constant rate, continuously charging a predetermined quantity of hydrogen-rich gas into the other end of said chamber countercurrent to the flow of said fuel, said hydrogen-rich gas containing at least 95% hydrogen, maintaining the pressure in the reactor at at least 1000 p.s.i.g., whereby said fuel and hydrogen react exothermically to produce a methane-rich fuel gas, maintaining said one end of the reactor at a temperature of about 1200 to 1300° F., and said other end at a temperature in excess of 1550° F., with drawing said methane-rich fuel gas from said one end of the reactor, and withdrawing fuel residue from said other end of the reactor.

2. The method of claim 1 in which the fuel is char prepared from bituminous coal, 17 s.c.f. of hydrogen are introduced for each pound of said char, the temperature at said one end is about 1240° F., the temperature at said other end is about 1600° F., and the pressure is maintained at about 2000 p.s.i.g.

3. The method of claim 1 in which said fuel is lignite char.

4. A continuous method for producing a methane-rich fuel gas which comprises charging particulate solid fossil fuel selected from the group consisting of bituminous coal char, lignite char, and nonagglomerating coal into a stream of hydrogen-rich gas flowing countercurrent to the fuel to form a moving bed, maintaining said bed at the point where the fuel is introduced at 1200 to 1300° F, to rapidly hydrogasify the raw feed fuel, and maintaining said bed at the point where the hydrogen-rich gas is introduced at more than 1550° F. to hydrogasify the partially-gasified fuel, a pressure of at least 1000 p.s.i.g. being maintained in said bed, thereby producing a fuel gas rich in methane.

5. The method of claim 4 in which said methane-rich fuel gas is subjected to purification comprising scrubbing to remove any ammonia and hydrogen sulfide.

6. The method of claim 5 which includes the additional step comprising catalytic conversion of carbon monoxide in said fuel gas to methane, whereby the heating value of the purified gas is increased to no less than 900 B.t.u.'s per standard cubic foot.

7. The method of claim 6 in which said fuel is lignite char.

References Cited
UNITED STATES PATENTS

| | | | |
|---|---|---|---|
| 2,662,816 | 12/1953 | Kalbach | 48—202 |
| 3,194,644 | 7/1965 | Gorin et al. | 48—197 |

JOSEPH SCOVRONEK, *Primary Examiner.*

MORRIS O. WOLK, *Examiner.*